United States Patent
Martin et al.

(10) Patent No.: US 9,612,343 B1
(45) Date of Patent: Apr. 4, 2017

(54) METHOD AND MOBILE STATION FOR USING A LOCATION DETERMINING MECHANISM BASED ON AN EXTENT OF TURNING

(75) Inventors: Geoffrey S. Martin, Overland Park, KS (US); Michael P. Dougan, Leawood, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1273 days.

(21) Appl. No.: 13/527,992

(22) Filed: Jun. 20, 2012

(51) Int. Cl.
| | |
|---|---|
| *G01S 19/48* | (2010.01) |
| *G01S 19/45* | (2010.01) |
| *G01C 21/16* | (2006.01) |
| *G01S 19/47* | (2010.01) |
| *G01S 19/49* | (2010.01) |
| *G01S 19/46* | (2010.01) |

(52) U.S. Cl.
CPC ............ *G01S 19/48* (2013.01); *G01C 21/165* (2013.01); *G01S 19/45* (2013.01); *G01S 19/46* (2013.01); *G01S 19/47* (2013.01); *G01S 19/49* (2013.01)

(58) Field of Classification Search
CPC .......... G01S 19/48; G01S 19/49; G01S 19/45; G01S 19/46; G01S 19/47; G01C 21/165
USPC ............... 342/357.31, 357.32, 357.28, 357.3
See application file for complete search history.

(56) References Cited

U.S. PATENT DOCUMENTS

| | | | | |
|---|---|---|---|---|
| 4,232,313 A | * | 11/1980 | Fleishman | G01S 13/93 342/31 |
| 5,906,655 A | * | 5/1999 | Fan | G01C 21/165 342/457 |
| 8,130,141 B2 | * | 3/2012 | Pattabiraman et al. | 342/357.29 |
| 8,374,787 B2 | * | 2/2013 | Tun | G01C 21/165 342/357.3 |
| 8,954,095 B2 | * | 2/2015 | Watanabe et al. | 455/456.5 |
| 2008/0272955 A1 | * | 11/2008 | Yonak | G01S 13/931 342/54 |
| 2014/0283578 A1 | * | 9/2014 | Czompo et al. | 73/1.37 |

FOREIGN PATENT DOCUMENTS

JP     H-0814927 A   *   1/1996   ............ G01C 21/00

* cited by examiner

*Primary Examiner* — Chuong P Nguyen

(57) ABSTRACT

Disclosed herein is a method and mobile station that improves upon a mobile station's ability to determine its location. By a mobile station considering its extent of turning and/or its travel speed, the mobile station may set an operational mode such that the mobile station uses an appropriate location determining mechanism. In the event that the mobile station is turning at a fast rate and/or traveling at a slow speed, a reasonable conclusion is that the mobile station is in a congested environment, and therefore a first operational mode may be set. In the event that the mobile station is turning at a slow rate and/or traveling at fast speed, a reasonable conclusion is that the mobile station is in an open environment, and therefore a second operational mode may be set.

18 Claims, 4 Drawing Sheets

METHOD AND MOBILE STATION FOR USING A LOCATION DETERMINING MECHANISM BASED ON AN EXTENT OF TURNING

BACKGROUND

Mobile wireless communication stations (mobile stations), such as mobile phones and tablets have become increasingly popular in recent years. For a user, a mobile station offers a variety of services including those related to software applications such as email, web browsing, and mapping. To provide an enhanced benefit to a user, these services often take into consideration the geographical location of the mobile station (and therefore the location of the user). As an example, a location-based service may provide a user with a map based on the user's location or may provide directions for travel between the user's location and another location. As another example, a location-based service may provide a user with a report of weather or traffic in the user's vicinity. As yet another example, a location-based service may provide a user with a list of services or establishments (e.g., restaurants, parks, or theatres) in the user's vicinity. As such, an important feature of a mobile station is the ability to determine its location.

There are several known mechanisms for determining the location of a mobile station. One or more of these mechanisms may be available depending on a number of factors, including for example, hardware included in or coupled to the mobile station, environmental conditions, and/or the availability of external resources.

A first example of a location determining mechanism uses a satellite-based technology called the Global Positioning System (GPS), and is referred to as autonomous-GPS. In this mechanism, a GPS interface (e.g., having a GPS receiver and a GPS antenna) included in or coupled to the mobile station searches for and acquires satellite signals transmitted from multiple GPS satellites orbiting the earth. Based on an analysis of these signals, the mobile station may then estimate its location.

The autonomous-GPS mechanism is generally known to determine a highly accurate location, however the amount of time required to use the mechanism may be long and considerable system resources may be needed. Indeed, the process of searching for and acquiring GPS signals, analyzing data, and computing the location of the mobile station is time consuming (often taking several minutes) and resource intensive.

A second example of a location determining mechanism is referred to as base station delay. This mechanism is similar to the autonomous-GPS mechanism described above, but uses base station signal delay measurements from a cellular wireless communication system (CWCS) instead of satellite signals. To use the base station delay mechanism, the mobile station typically includes or is coupled to a cellular network interface (e.g., having a cellular antenna), such that the mobile station can operate within a CWCS.

Typically, the base station delay mechanism is less accurate at determining a location than the autonomous-GPS mechanism. However, in many cases, an estimated location is sufficient for providing a location-based service. For instance, an estimated location may be sufficient to perform a database lookup to find pizza restaurants or other attractions or points of interest in the user's vicinity. Likewise, an estimated location may be sufficient to facilitate dispatch of emergency personnel approximately to the location of the user. Also, while the base station delay mechanism may provide relatively less accurate results, the process of determining the location is typically faster than the autonomous-GPS mechanism.

A third example of a location determining mechanism is referred to as assisted-GPS or a-GPS and largely combines the base station delay and the autonomous-GPS mechanisms. In this mechanism, a positioning system uses the estimated location determined using the base station delay mechanism to determine which GPS satellites should be in the sky over the mobile station. Then, the positioning system directs the GPS interface included in or coupled to the mobile station to tune to those particular satellites to receive satellite signals and carry out the remaining process of the autonomous-GPS mechanism. By initially determining the appropriate satellites to obtain signals from, the location is often determined faster that when using the traditional autonomous-GPS mechanism, yet it still provides highly accurate results.

A fourth example of a location determining mechanism is referred to as service set identifier (SSID)-matching. This mechanism is typically available to a mobile station including or coupled to a wireless local area network (WLAN) interface (e.g., including a WLAN antenna) that is configured to connect to a WLAN. An SSID is a unique identifier for a WLAN that is typically publically broadcast by a wireless access point (WAP) connected to the WLAN. By activating a WLAN discovery mode on a mobile station, the mobile station scans for locally broadcasting SSIDs. This is typically performed to facilitate connection between a mobile station and a particular WLAN. However, when using the SSID-matching mechanism, the locally broadcasting SSIDs are instead used to determine a location of the mobile station. To enable use of this mechanism, an SSID-to-location database is maintained that stores records of locally broadcasting SSIDs and their corresponding locations. As such, by querying the database based on a given set of SSIDs scanned by a mobile station, a location of the mobile station can be determined. The SSID-matching mechanism is often reasonably accurate at determining a location and may likely take considerably less time the satellite-based mechanisms described above.

OVERVIEW

Disclosed herein is a method and mobile station that improves upon its ability to determine its location. By the mobile station considering its extent of turning and/or its travel speed, it may set an operational mode such that the mobile station uses an appropriate location determining mechanism.

For example, in the event that a mobile station is turning at a fast rate (e.g., making more than three right-angled turns per minute) and/or traveling at a slow speed (e.g., under fifty miles per hour), it is reasonable to conclude that the mobile station is in a vehicle traveling in congested environment, such as a city or an urban area. Congested environments often have dense populations, and therefore they are more likely to have locally broadcasting SSIDs. As such, in these environments, an SSID-matching mechanism is reasonably likely to be effective. Congested environments also typically have buildings and other objects that may likely obstruct satellite signals. As such, if a mobile station is turning at a fast rate and/or traveling at a slow speed, the mobile station may set its operational mode such that the mobile station determines its location using an SSID-matching mechanism.

On the other hand, in the event that a mobile station is turning at a slow rate and/or traveling at a fast speed, it is reasonable to conclude that the mobile station is in a vehicle traveling in an open environment (e.g., on a country road). In these environments, satellite signals may likely be available with limited interference from obstructing objects such as tall buildings. Also, these environments are often sparsely populated, and may likely have a limited number of locally broadcasting SSIDs. Therefore, if a mobile station is turning at a slow rate and/or traveling at a fast speed, the mobile station may set its operational mode such that the mobile station determines its location using a satellite-based location determining mechanism, such as autonomous-GPS or assisted-GPS.

DETAILED DESCRIPTION

Throughout this disclosure, any reference to "a," "an," or "the" refers to "at least one," or "the at least one," unless otherwise specified.

Figure 1:
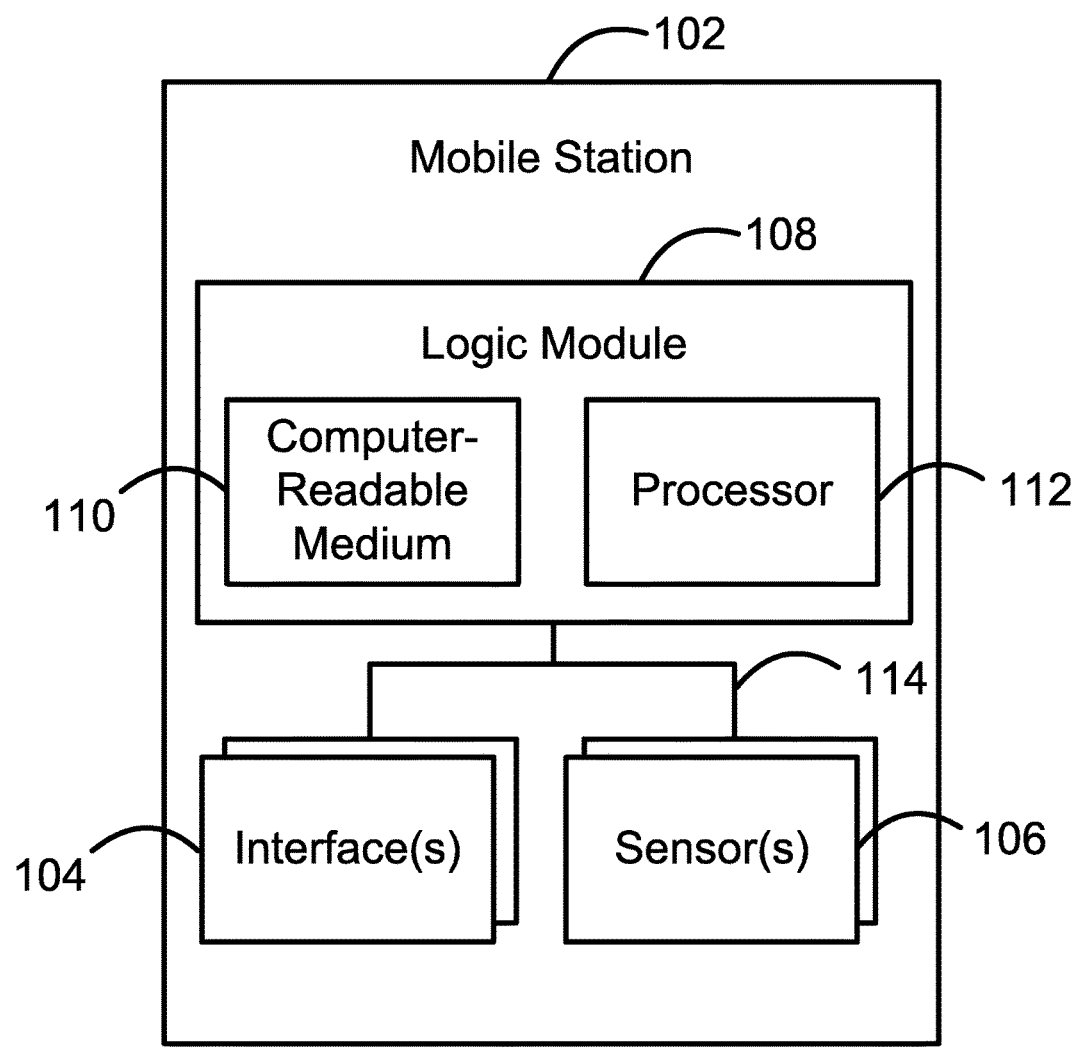
FIG. 1 is a simplified block diagram depicting components of a mobile station arranged to implement functions in accordance with the present method.

Referring to the drawings, as noted above, FIG. 1 is a simplified block diagram of a mobile station 102 arranged to implement functions in accordance with the present method. Included in the mobile station 102 may be one or more wired or wireless interfaces 104. Example wireless interfaces include a GPS interface, a cellular network interface, and a WLAN interface, each of which may also include a corresponding antenna and/or receiver. The mobile station 102 may further include one or more sensors 106, including for example a linear velocity sensor, an accelerometer, a compass, and a gyroscope.

A logic module 108 may be included in the mobile station 102, and may be implemented as a non-transitory computer-readable medium 110 and a processor 112, wherein the computer-readable medium contains instructions that, when executed by the processor, cause performance of one or more functions in accordance with the present method. In another embodiment, the logic module 108 may be implemented as a hardcoded chipset (e.g., an application specific integrated circuit). The one or more interfaces 104, the one or more sensors 106, and the logic module 108 may be coupled together or otherwise integrated by a system bus or other connection mechanism 114.

The mobile station 102 refers to any apparatus that may be moved and may come in a variety of forms, examples of which include a mobile phone, tablet, laptop, media player, gaming device, tracking device, telemetry device or vehicle. Mobile stations may also be standalone devices or may be embedded in other devices. Further, the term mobile station may refer to a single device or a set of two or more coupled devices. For example, a mobile station may include a vehicle (e.g., an automobile) that includes one or more of the above-described components, and another device (e.g., a mobile phone) that is coupled to the vehicle and that includes one or more of the above-described components.

The mobile station 102 may have multiple operational modes and may be set to operate in one of those modes at any given time. A particular operational mode defines a location determining mechanism that the mobile station uses to determine its location. For example, if the mobile station sets its first operational mode, the mobile station may determine its location using an SSID-mechanism, whereas if the mobile station sets its second operational mode is set, the mobile station may determine its location using an autonomous-GPS mechanism. An operational mode may also define multiple location determining mechanisms to use, and may further define an order of priority for using the mechanisms until a location of the mobile station is successfully determined (e.g., to prioritize a location determining mechanism that utilizes the least amount of system resources).

Figure 2:
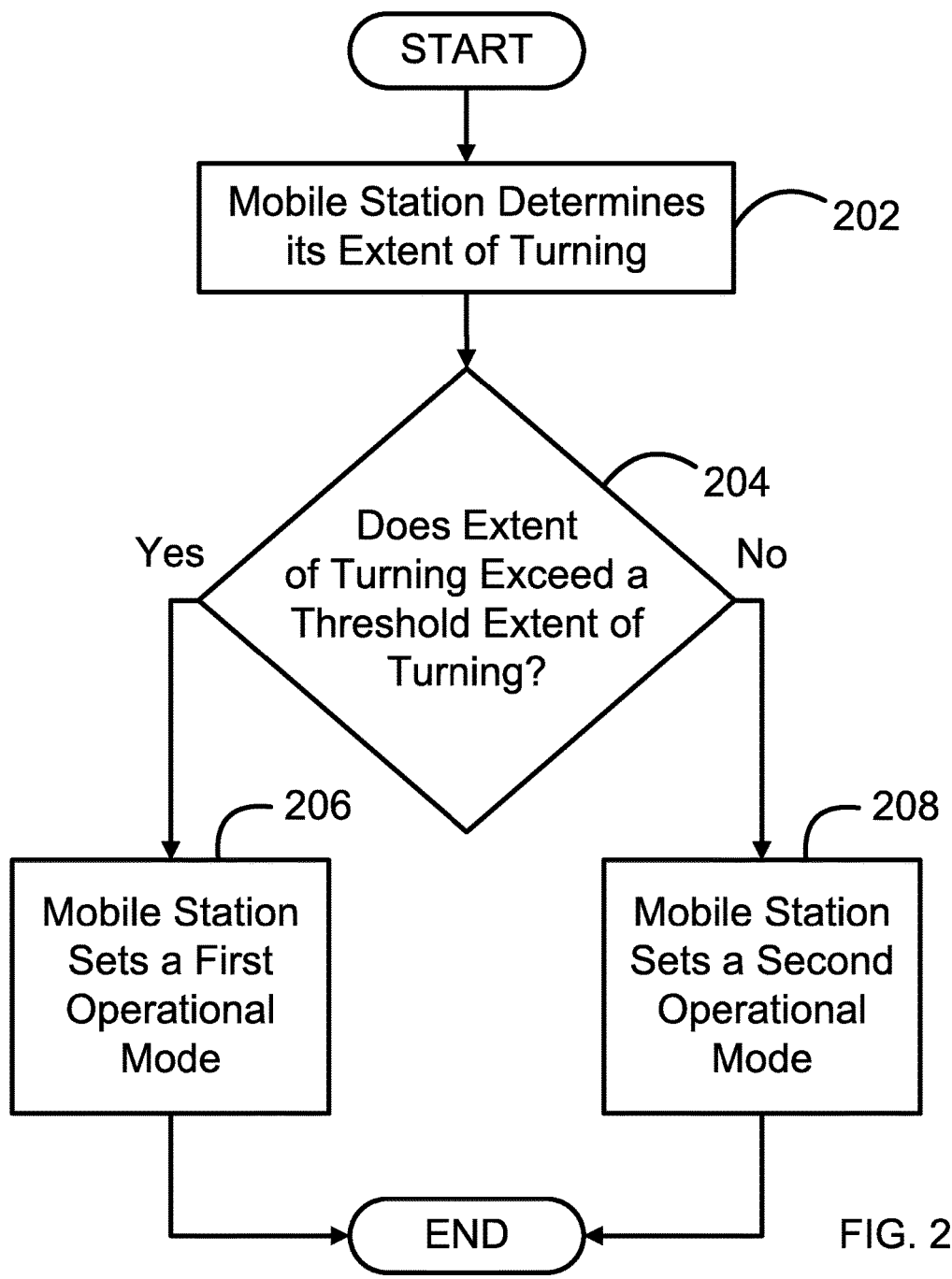
FIG. 2 is a flow chart depicting functions in accordance with a first embodiment of the present method.

Turning now to FIG. 2, a flow chart depicting functions in accordance with a first embodiment of the present method is shown. In the first embodiment of the present method, a mobile station 102 considers its extent of turning as a basis for setting its operational mode. An extent of turning of the mobile station may reasonably indicate the type of environment that the mobile station is in. In one example, an environment may be categorized as one of two types, namely a congested environment (e.g., a city or an urban area) and an open environment (e.g., a country road).

A congested environment typically has certain characteristics including for example the presence of one way streets, numerous intersections, and construction detours. As such, a mobile station 102 that is (or is located in) a vehicle traveling in a congested environment is likely to have a "high" extent of turning (i.e., defined as an extent of turning exceeding a threshold extent of turning). Therefore, if a mobile station has a high extent of turning, a reasonable conclusion is that the mobile station is in a congested environment. On the other hand, if a mobile station has a "low" extent of turning, a reasonable conclusion is that that the mobile station is (or is located in) a vehicle traveling in an open environment. Therefore, depending on the extent of turning of the mobile station, the mobile station may set an operational mode appropriate for the environment that the mobile station is in.

While these environment conclusions may be reasonable, it should be appreciated that in some cases they may be wrong (e.g., a vehicle may make few turns while traveling in a city). Further, it should be noted that the mobile station 102 might not explicitly make these conclusions, but may instead set the appropriate operational mode based on the determined extent of turning. The discussion relating to these conclusions in intended only to provide an explanation as to why a mobile station may set certain operational modes depending on its extent of turning.

Thus as shown in FIG. 2, at block 202, the method may involve the mobile station 102 determining its extent of turning perhaps by using the one or more sensors 106 included in or coupled to the mobile station. For example, the mobile station may determine its extent of turning using an accelerometer, compass, or gyroscope included in or coupled to the mobile station. In another example, particularly where the mobile station is (or includes) a vehicle, a mobile station may receive extent of turning measurements from an on-board diagnostics system included in the vehicle (e.g., via a wired or wireless connection).

For the mobile station to determine its extent of turning, the mobile station 102 may first need to define what constitutes a "turn." For example, the mobile station may consider that a substantially right-angled turn constitutes a turn (likely resulting from a vehicle turning at an intersection), but the mobile station may also consider other criteria or thresholds. In one example, the mobile station may determine that it turned by (i) the mobile station obtaining a first set of data representing direction from the one or more sensors 106 at a first time, (ii) the mobile station obtaining a second set of data representing direction from the one or more sensors at a second time that is later than the first time (likely a short time later such as approximately one second), (iii) the mobile station comparing the first and second sets of data; (iv) if a change between the compared data exceeds a threshold change, the mobile station determining that it turned; and (v) if a change between the first and second sets of data does not exceed the threshold change, the mobile station determining that it did not turn. Notably, the extent of turning of the mobile station may represent, for example, a sheer number of turns made by the mobile station or a turn rate of the mobile station (e.g., turns per time unit or per distance traveled unit).

Notably, the above-described techniques for the mobile station determining its extent of turning are provided as mere examples. Indeed, other techniques that are known or that become discovered in the future may be employed for the mobile station to determine its extent of turning in accordance with the present method.

Continuing with reference to FIG. 2, at block 204, the method next may involve the mobile station 102 determining if the extent of turning exceeds a threshold extent of turning. If the extent of turning exceeds the threshold extent of turning, at block 206, the method may involve the mobile station setting a first operational mode of the mobile station. If the extent of turning is a turn rate defined as turns per time unit, in practice the threshold extent of turning may for example be a value in a range from two turns per minute to five turns per minute, and in one particular example may be approximately three turns per minute. Alternatively, if the extent of turning is a rate defined as turns per distanced travel unit, in practice the threshold extent may for example be a value in a range of one turn per two hundred feet and one turn per four hundred feet, and in one particular example is approximately one turn per three hundred feet.

As discussed above, if the extent of turning of the mobile station 102 exceeds a threshold extent of turning, a reasonable conclusion is that the mobile station is in a congested environment. On the other hand, if the extent of turning of the mobile station 102 does not exceed a threshold extent of turning, a reasonable conclusion is that the mobile station is in an open environment.

Since congested environments typically have dense populations, they may likely have many locally broadcasting SSIDs, and therefore use of the SSID-matching location determining mechanism is likely to be effective. However, in a congested environment, buildings and other objects may likely obstruct satellite signals, and therefore the use of a satellite-based location determining mechanism is likely to be ineffective. As such, in the first operational mode of the mobile station 102, in one example the mobile station may determine its location without using satellite data (e.g., satellite signals), and in a particular example, the mobile station may instead use the SSID-matching mechanism.

If at block 204 the determined extent of turning does not exceed the threshold extent of turning, at block 208, the method may involve the mobile station 102 setting a second operational mode of the mobile station. In this instance, a reasonable conclusion is that the mobile station is in an open environment. In open environments, the SSID-matching mechanism is likely to be ineffective as these environments are often sparsely populated, and may likely have a limited number of locally broadcasting SSIDs. However, in open environments, satellite signals are likely to be available with limited interference from obstructing objects such as tall buildings, and therefore use of a satellite-based location determining technique is likely to be effective. Accordingly, in the second operational mode of the mobile station, in one example the mobile station may determine its location using, at least in part, satellite data. For example, in the second operational mode, the mobile station may use an autonomous-GPS or an assisted-GPS mechanism.

Based on an extent of turning of the mobile station 102, a reasonable conclusion concerning as to its environment may be made. However, as noted above, in some cases, this conclusion may be wrong. Therefore, in some instances the mobile station may consider additional information, namely its travel speed, to set its operational mode.

In the event that a mobile station is (or is located in) a vehicle that is traveling at a "fast" speed (i.e., defined as a travel speed exceeding a threshold speed), a reasonable conclusion is that the mobile station is (or is located in) a vehicle traveling in an open environment. In this instance, the mobile station may set a second operational mode without considering its extent of turning. However, in the event that a mobile station is (or is located in) a vehicle that is traveling at a "slow" speed, it may be difficult to reasonably conclude one way or the other what type of environment the mobile station is in. In this case, the mobile station may consider its extent of turning (as described above) as a basis to set an appropriate operational mode.

Figure 3A:
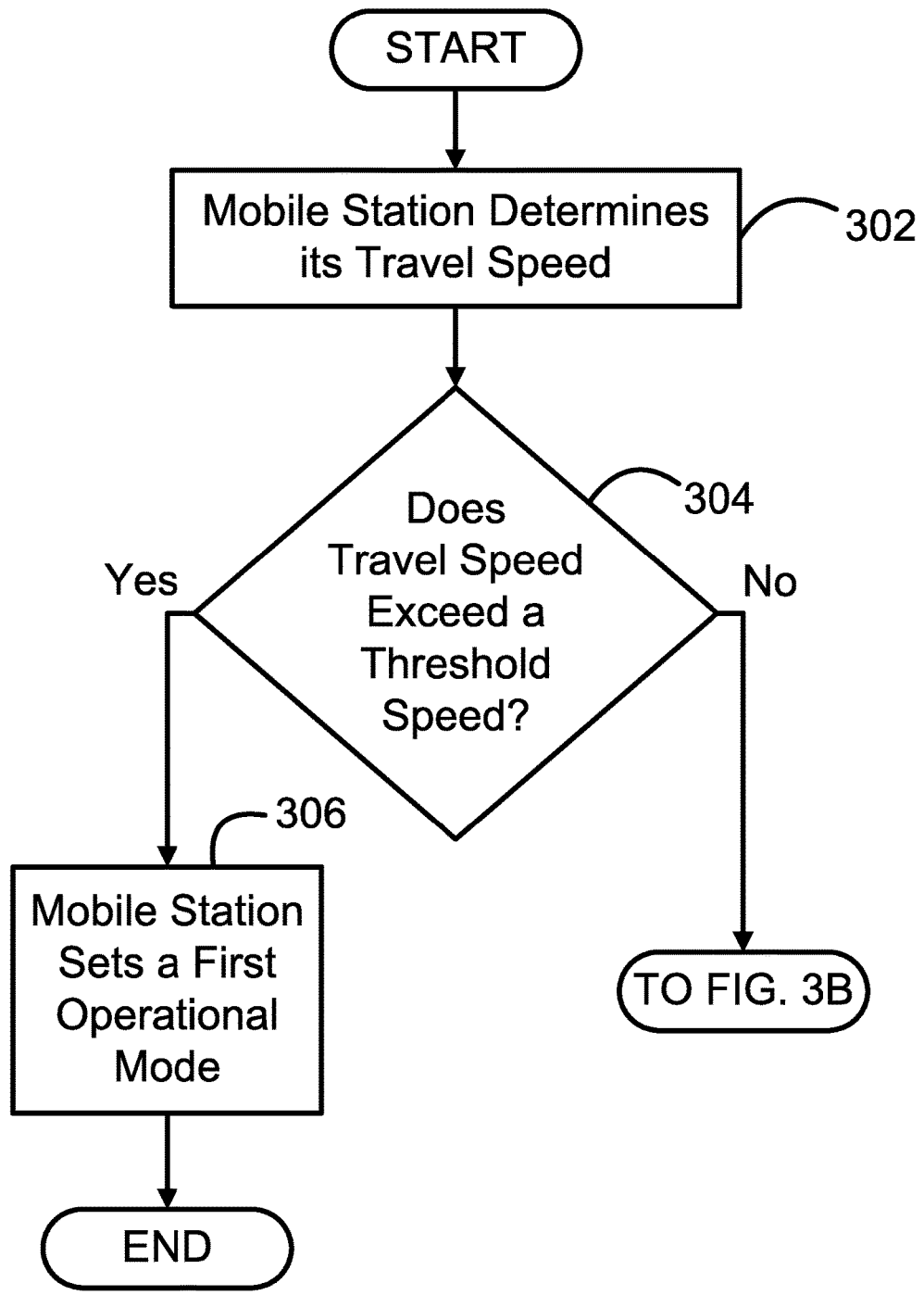
FIG. 3 (parts A and B) is a flow chart depicting functions in accordance with a second embodiment of the present method.
Figure 3B:
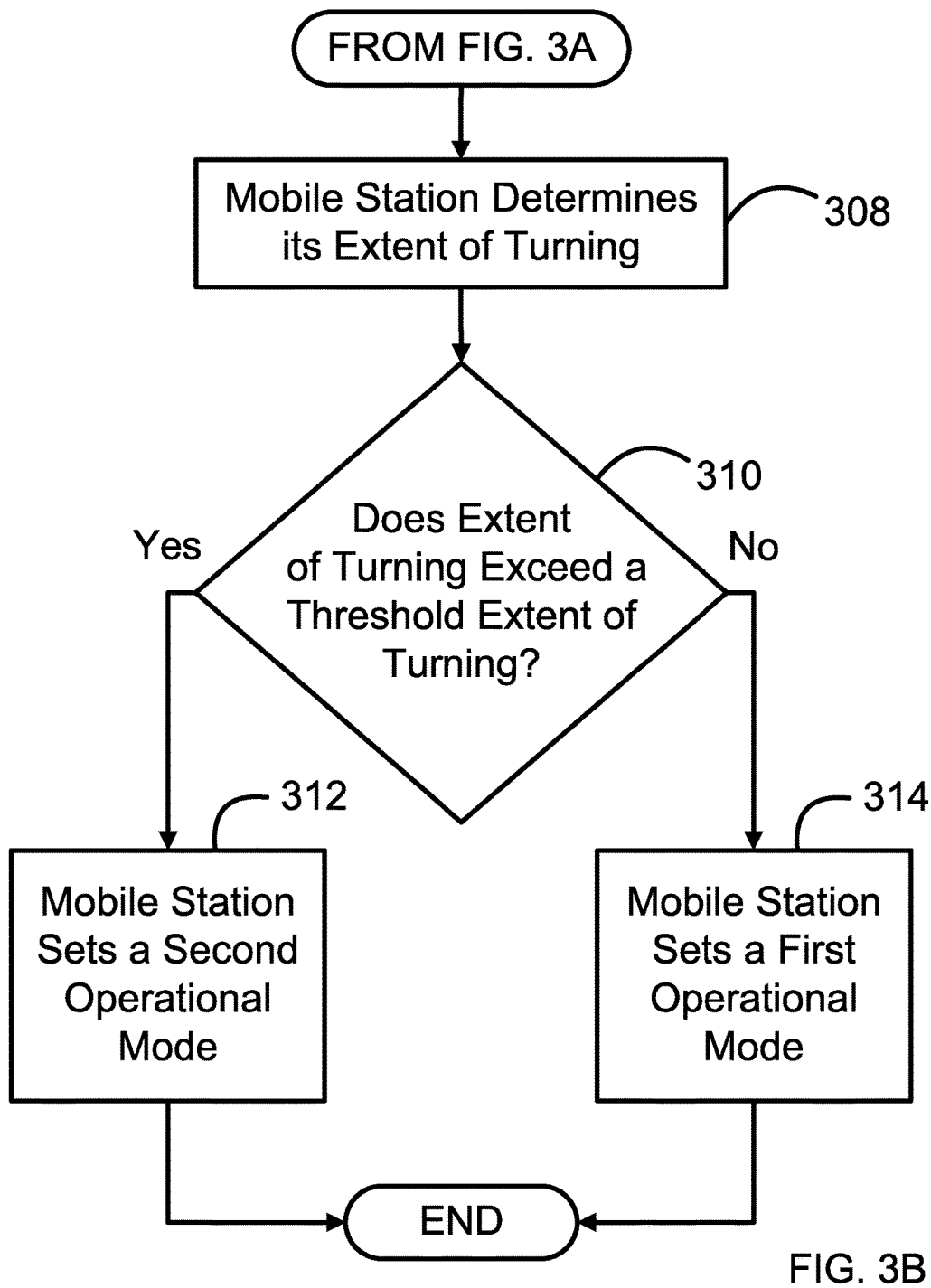

Turning now to FIG. 3, a flow chart depicting functions in accordance with a second embodiment of the present method is shown. In this embodiment, the mobile station 102 considers its travel speed and potentially its extent of turning as a basis to set its operational mode. At block 302, the method may involve the mobile station determining its travel speed. Like the function of the mobile station determining its extent of turning, the mobile station may determine its travel speed using the one or more sensors 106, including for example an accelerometer, a compass, and/or a gyroscope.

As one example, the one or more sensors 106 may include a linear velocity sensor that provides travel speed measurements. As another example, the one or more sensors 106 may include an accelerometer. Since an accelerometer provides acceleration measurements and acceleration is a derivative of speed, the mobile station may determine its travel speed by applying an integral function to the acceleration measurements. In yet another example, particularly where the mobile station 102 includes or is coupled to a vehicle, the mobile station may receive travel speed measurements from a pulse-counting engine sensor, a wheel sensor, or an on-board diagnostics system included in the vehicle (e.g., via a wired or wireless connection). Notably, the above-described techniques for the mobile station determining its travel speed are provided as mere examples. Other techniques that are now known or that become discovered in the future may be employed to determine travel speed in accordance with the present method.

At block 304, the method next may involve making a determination of whether the travel speed exceeds a threshold speed. If the determination is that the determined travel speed exceeds the threshold speed, then, at block 306, the method may involve the mobile station 102 setting a first operational mode of the mobile station (e.g., that uses a satellite-based mechanism as discussed above). In practice, the threshold speed may for example be a value in a range from fifty miles per hour to eighty miles per hour, and in one particular example is approximately sixty miles per hour. However, the threshold speed may be modified depending on the desired configuration (e.g., depending on factors such as average city and highway speed limits).

As described above, if a mobile station 102 is traveling at a "fast" speed (i.e., defined as a travel speed exceeding the threshold speed), a reasonable conclusion is that the mobile station is (or is located in) a vehicle traveling in an open environment such as on a country road. On the other hand, if the mobile station is traveling at a "slow" speed, the mobile station may consider its turning extent, as it is may be difficult to reasonably conclude whether the mobile station is in a congested environment or an open environment. Indeed, while a vehicle traveling in congested environment is likely to be traveling at a slow speed, the vehicle may also be traveling at a slow speed in an open environment due to speed limits, road conditions, etc.

If the determination at block 304 is that the determined travel speed does not exceed the threshold speed, the method involves carrying out the functions of blocks 308, 310, and either 312 or 314 such that the mobile station 102 sets its operational mode based on its extent of turning. Notably, the functions of blocks 308, 310, and either 312 or 314 parallel the functions of blocks 202, 204, and either 206 or 208, respectively (as described above in connection with the first embodiment).

At block 308, the method may involve the mobile station 102 determining its extent of turning. At block 310, the method may involve the mobile station determining if its extent of turning exceeds the threshold extent of turning. If the extent of turning exceeds the threshold extent of turning, at block 312, the method involves the mobile station setting a second operational mode of the mobile station (e.g., that uses an SSID-matching mechanism). Alternatively, if the determined extent of turning does not exceed a threshold extent of turning, at block 314, the method may involve the mobile station setting the first operational mode of the mobile station (e.g., that uses a satellite-based location determining mechanism).

While one or more functions of the present method have been described as being performed by the mobile station 102, it is noted that the one or more function may also be performed by one or more other entities. Further, while particular definitions of first and second operational modes have been described, the present method and mobile station is not restricted to using those operational modes. Indeed, any number of operational modes may be defined and may be set based on any of the conditions (including combinations thereof) described throughout this disclosure, with each operational mode defining a corresponding one or more location determining mechanisms (or a corresponding type of data used for the mechanism).

Also, a potential location determining mechanism (i.e., to be associated with an operational mode) need not be selected from the mechanisms explicitly described, but may include any mechanism now known or discovered in the future. Moreover, it should be noted that any description of an operational mode using a particular location-determining mechanism (or category of mechanism) should not be construed as using solely that particular mechanism (or category), but instead may define the prioritized use of that mechanism, among others.

While embodiment of the present method and mobile station have been described above, those of ordinary skill in the art will appreciate that variations from the embodiment described are possible, and that numerous changes may therefore be made while remaining within the true scope and spirit of the invention as described by the claims.

We claim:
1. A method comprising:
   determining, by a mobile station, an extent of turning of the mobile station;
   determining, by the mobile station, whether the determined extent of turning exceeds a predefined threshold extent of turning;
   based on the determination of whether the determined extent of turning exceeds the predefined threshold extent of turning, determining, by the mobile station, whether or not to use data that includes satellite data in determining a location of the mobile station; and
   determining, by the mobile station, the location of the mobile station, wherein based on the determination of whether or not to use data that includes satellite data in determining the location of the mobile station, the mobile station selectively uses or does not use data that includes satellite data in determining the location of the mobile station.

2. The method of claim 1, wherein the mobile station includes one or more sensors, wherein determining the extent of turning of the mobile station comprises using the one or more sensors in determining the extent of turning of the mobile station.

3. The method of claim 2, wherein the one or more sensors comprise an accelerometer.

4. The method of claim 2, wherein determining the extent of turning of the mobile station comprises:
   obtaining a first set of data representing direction from the one or more sensors at a first time;
   obtaining a second set of data representing direction from the one or more sensors at a second time that is later than the first time;
   comparing the first and second sets of data;
   determining whether a change between the compared first and second sets of data exceeds a threshold change; and
   based on the determination of whether the change between the compared first and second sets of data exceeds the threshold change, determining whether or not the mobile station turned.

5. The method of claim 1, wherein the extent of turning is a turn rate of the mobile station and the predefined threshold extent of turning is a value in a range from two turns per minute to five turns per minute.

6. The method of claim 1, wherein the extent of turning is a turn rate of the mobile station and the predefined threshold extent of turning is a value in a range from one turn per two hundred feet to one turn per four hundred feet.

7. The method of claim 1, wherein determining the extent of turning of the mobile station comprises determining an extent to which the mobile station has made substantially right-angled turns.

8. The method of claim 1, wherein determining whether or not to use data that includes satellite data in determining the location of the mobile station comprises making a determination to use data that includes satellite data in determining the location of the mobile station, and wherein determining the location of the mobile station comprises using one of an autonomous-GPS location determining technique and an assisted-GPS location determining technique in determining the location of the mobile station.

9. The method of claim 1, wherein determining whether or not to use data that includes satellite data in determining the location of the mobile station comprises making a determination to not use data that includes satellite data in determining the location of the mobile station, and wherein determining the location of the mobile station comprises using an SSID-matching location technique in determining the location of the mobile station.

10. A mobile station comprising:
an antenna; and
a logic module, wherein the module is configured for:
(i) determining an extent of turning of the mobile station;
(ii) determining whether the determined extent of turning exceeds a predefined threshold extent of turning;
(iii) based on the determination of whether the determined extent of turning exceeds the predefined threshold extent of turning, determining whether or not to use data that includes satellite data in determining a location of the mobile station; and
(iv) determining the location of the mobile station, wherein based on the determination of whether or not to use data that includes satellite data in determining the location of the mobile station, the mobile station selectively uses or does not use data that includes satellite data in determining the location of the mobile station.

11. The mobile station of claim 10, wherein the mobile station includes one or more sensors, wherein determining the extent of turning of the mobile station comprises using the one or more sensors in determining the extent of turning of the mobile station.

12. The mobile station of claim 11, wherein the one or more sensors comprise an accelerometer.

13. The mobile station of claim 11, wherein determining the extent of turning of the mobile station comprises:
obtaining a first set of data representing direction from the one or more sensors at a first time;
obtaining a second set of data representing direction from the one or more sensors at a second time that is later than the first time;
comparing the first and second sets of data;
determining whether a change between the compared first and second sets of data exceeds a threshold change; and
based on the determination of whether the change between the compared first and second sets of data exceeds the threshold change, determining whether or not the mobile station turned.

14. The mobile station of claim 10, wherein the extent of turning is a turn rate of the mobile station and the predefined threshold extent of turning is a value in a range from two turns per minute to five turns per minute.

15. The mobile station of claim 10, wherein the extent of turning is a turn rate of the mobile station and the predefined threshold extent of turning is a value in a range from one turn per two hundred feet to one turn per four hundred feet.

16. The mobile station of claim 10, wherein determining the extent of turning of the mobile station comprises determining an extent to which the mobile station has made substantially right-angled turns.

17. The mobile station of claim 10, wherein determining whether or not to use data that includes satellite data in determining the location of the mobile station comprises making a determination to use data that includes satellite data in determining the location of the mobile station, and wherein determining the location of the mobile station comprises using one of an autonomous-GPS location determining technique and an assisted-GPS location determining technique in determining the location of the mobile station.

18. The mobile station of claim 10, wherein determining whether or not to use data that includes satellite data in determining the location of the mobile station comprises making a determination to not use data that includes satellite data in determining the location of the mobile station, and wherein determining the location of the mobile station comprises using an SSID-matching location technique in determining the location of the mobile station.

* * * * *